(12) United States Patent
Shinohe

(10) Patent No.: US 9,798,389 B2
(45) Date of Patent: Oct. 24, 2017

(54) VIBRATION GENERATOR HOLDING STRUCTURE AND INPUT DEVICE

(71) Applicant: ALPS ELECTRIC CO., LTD., Tokyo (JP)

(72) Inventor: Akihiro Shinohe, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/077,136

(22) Filed: Mar. 22, 2016

(65) Prior Publication Data
US 2016/0301292 A1 Oct. 13, 2016

(30) Foreign Application Priority Data

Apr. 10, 2015 (JP) ................................. 2015-080967

(51) Int. Cl.
*G06F 3/041* (2006.01)
*G06F 3/01* (2006.01)

(52) U.S. Cl.
CPC .............. *G06F 3/016* (2013.01); *G06F 3/041* (2013.01); *G06F 2203/013* (2013.01)

(58) Field of Classification Search
CPC ..... G06F 3/016; G06F 3/041; G06F 2203/013
USPC ........................................... 340/407.1–407.2
See application file for complete search history.

(56) References Cited

U.S. PATENT DOCUMENTS

| | | | | |
|---|---|---|---|---|
| 7,400,319 B2* | 7/2008 | Nakayama | ............... | G06F 3/045 178/18.03 |
| 2015/0212579 A1* | 7/2015 | Nakamura | ............ | G06F 1/1626 345/173 |

FOREIGN PATENT DOCUMENTS

JP 2005222326 A 8/2005

* cited by examiner

*Primary Examiner* — Qutbuddin Ghulamali
(74) *Attorney, Agent, or Firm* — Brinks Gilson & Lione

(57) ABSTRACT

A holding structure for holding a vibration generator includes a first holding member that is in contact with the vibration generator, a second holding member that engages the first holding member, and an elastic member that is supported by the second holding member and urges the vibration generator toward the first holding member.

8 Claims, 6 Drawing Sheets

VIBRATION GENERATOR HOLDING STRUCTURE AND INPUT DEVICE

CLAIM OF PRIORITY

This application claims benefit of priority to Japanese Patent Application No. 2015-080967 filed on Apr. 10, 2015, which is hereby incorporated by reference in its entirety.

BACKGROUND

1. Field of the Disclosure

The present disclosure relates to a vibration generator holding structure and to an input device that has an input means, a vibration generator, and the vibration generator holding structure.

An input device in practical use has an input means for detecting an input manipulation performed by a manipulator, a vibration generator that generates vibration to be transmitted to the manipulator, and a holding structure that holds the vibration generator (referred to below as the vibration generator holding structure). The input device can detect an input manipulation and can feed back vibration in response to the input manipulation. Therefore, the input device is used as, for example, an input device for a tablet terminal or a controller for a game machine. A conventional input device formed as described above is disclosed in, for example, Japanese Unexamined Patent Application Publication No. 2005-222326. The structure of the conventional input device will be described below with reference to FIG. 7. FIG. 7 illustrates the structure of the conventional input device; specifically FIG. 7 illustrates the structure of a conventional tablet device 201 (input device) described in Japanese Unexamined Patent Application Publication No. 2005-222326.

As illustrated in FIG. 7, the tablet device 201 has a manipulation panel 203 having an input manipulation surface 203a, a support board 204 placed on the same side as the rear surface of the manipulation panel 203 so as to form a stack, the support board 204 supporting the manipulation panel 203, a vibration generator that generates vibration to be transmitted to a manipulator, and an input means that corresponds to an input manipulation performed by the manipulator.

The input means includes a movable conductive layer 206 and a fixed conductive layer 207, which are disposed between the rear surface of the manipulation panel 203 and a surface, of the support board 204, which faces the manipulation panel 203. The movable conductive layer 206 and fixed conductive layer 207 are connected to an external circuit (not illustrated) through a lead electrode 208a, a lead electrode 208b, a lead electrode 209a, a lead electrode 209b, a lead pattern 212a, a lead pattern 212b, a lead pattern 212c, a lead pattern 212d, and the like.

The vibration generator is an elongated strip-shaped piezoelectric board 202 made of a piezoelectric ceramic material based on lead zirconate titanate (PZT). A driving electrode 202a and a driving electrode 202b are provided on the piezoelectric board 202. When a driving voltage is applied to the driving electrode 202a and driving electrode 202b, the piezoelectric board 202 generates predetermined vibration. The piezoelectric board 202 is fastened directly to the rear surface of the support board 204 by using an adhesive tape, an adhesive, or the like, and is held by the support board 204.

With the conventional tablet device 201 (input device) described in Japanese Unexamined Patent Application Publication No. 2005-222326, the piezoelectric board 202 (vibration generator) has been fastened directly to the rear surface of the support board 204. This has led to the possibility that the portion at which the piezoelectric board 202 and support board 204 are fastened together is broken due to vibration generated by the piezoelectric board 202, in which case the piezoelectric board 202 easily comes off the support board 204 and transmission of vibration from the piezoelectric board 202 to the support board 204 is impeded.

The portion at which the piezoelectric board 202 and support board 204 are fastened together is likely to broken, particularly when there is a large difference between the frequency of vibration generated by the piezoelectric board 202 and the natural vibration frequency of the support board 204. To generate more large vibration, large-mass vibration generators of electromagnetic induction type that utilize a magnetic force between a permanent magnet and an electromagnet are being used in recent years. In this situation as well, the portion at which the piezoelectric board 202 and support board 204 are fastened together is likely to be broken.

SUMMARY

A vibration generator holding structure has a first holding member that is in contact with a vibration generator, a second holding member that engages the first holding member, and an elastic member that is supported by the second holding member and urges the vibration generator toward the first holding member.

For the vibration generator holding structure to hold the vibration generator, the vibration generator is made to abut the first holding member and the elastic member supported by the second holding member urges the vibration generator toward the first holding member. Thereby, the vibration generator is fastened directly neither to the first holding member nor to the second holding member, so the vibration generator can be held without a fastened portion being damaged. In addition, since the elastic member urges the vibration generator toward the first holding member, a contact between the vibration generator and the first holding member can be stably maintained. As a result, the vibration generator can be stably held. Furthermore, the stable contact between the vibration generator and the first holding member enables vibration to be stably transmitted from the vibration generator to the first holding member. Since the first holding member is engaged with the second holding member, vibration can be stably transmitted from the vibration generator through the first holding member to the second holding member. As a result, vibration can be stably transmitted from the vibration generator to the first holding member and second holding member

DESCRIPTION OF THE EXEMPLARY EMBODIMENTS

Embodiments of the present invention will be described below with reference to FIGS. 1 to 6. In these drawings, the direction indicated by X1 is the left direction, the direction indicated by X2 is the right direction, the direction indicated by Y1 is the forward direction, the direction indicated by Y2 is the backward direction, the direction indicated by Z1 is the upward direction, and the direction indicated by Z2 is the downward direction.

Figure 1:
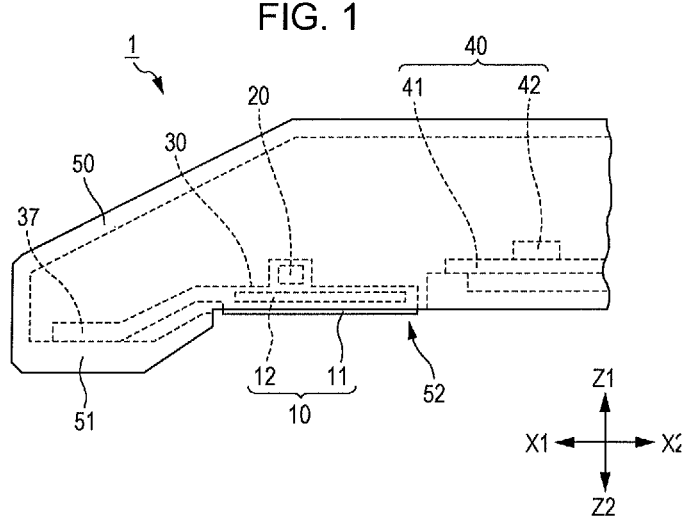
FIG. 1 illustrates the structure of an input device according to a first embodiment of the present invention.
Figure 2:
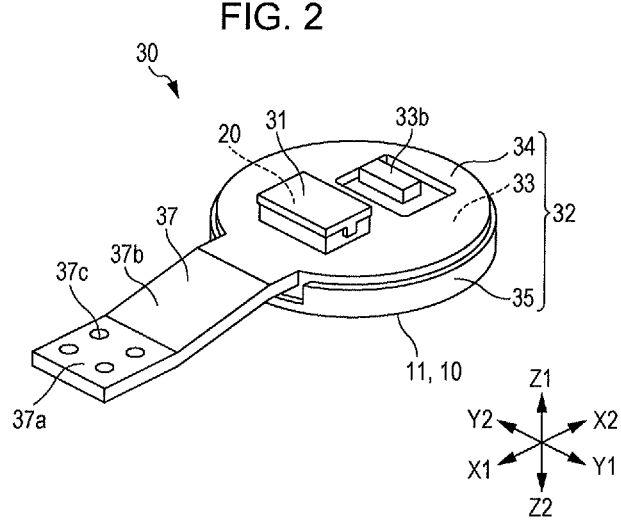
FIG. 2 is a perspective view of a holding part according to the first embodiment of the present invention.
Figure 3A:
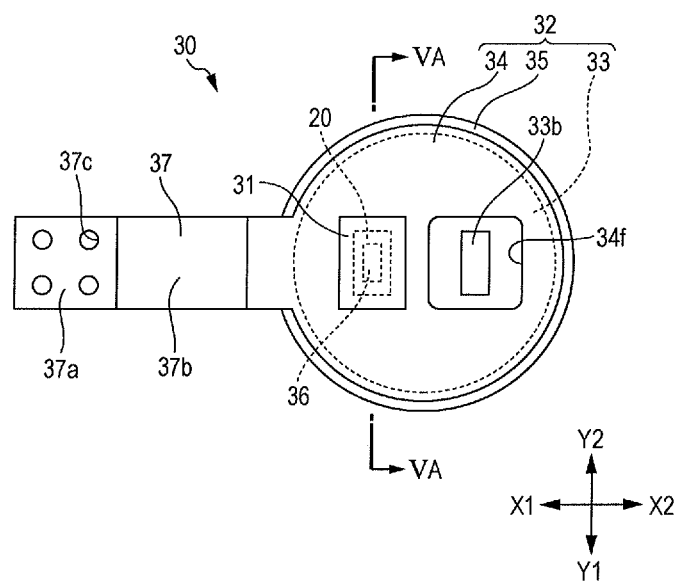
FIG. 3A is a top view of the holding part according to the first embodiment of the present invention.
Figure 3B:
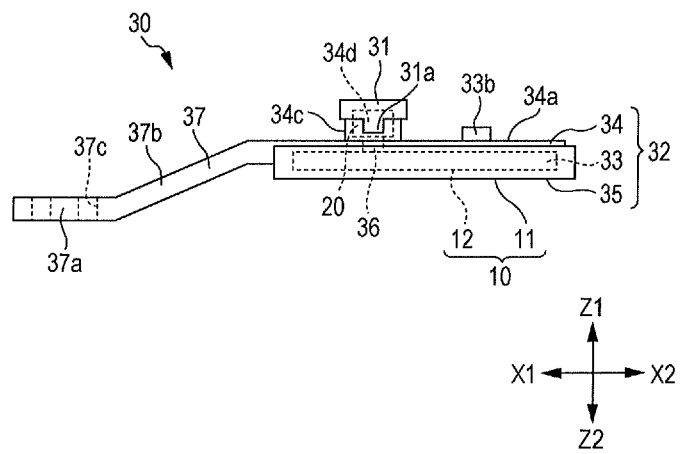
FIG. 3B is its side view.
Figure 4:
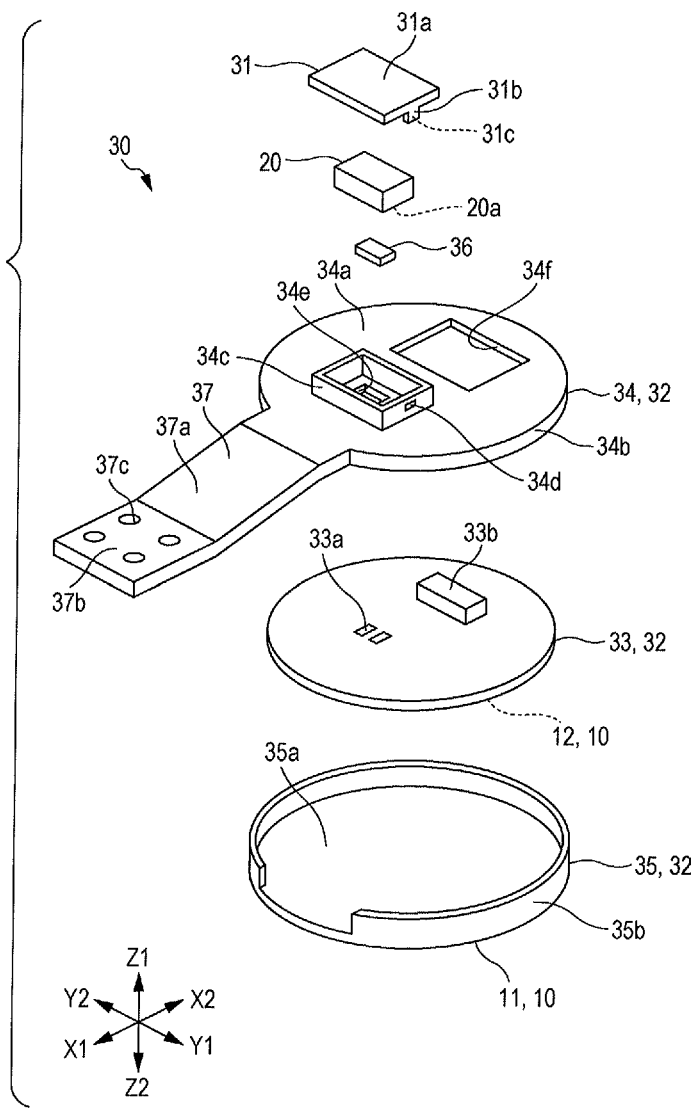
FIG. 4 is an exploded perspective view of the holding part according to the first embodiment of the present invention.
Figure 5A:
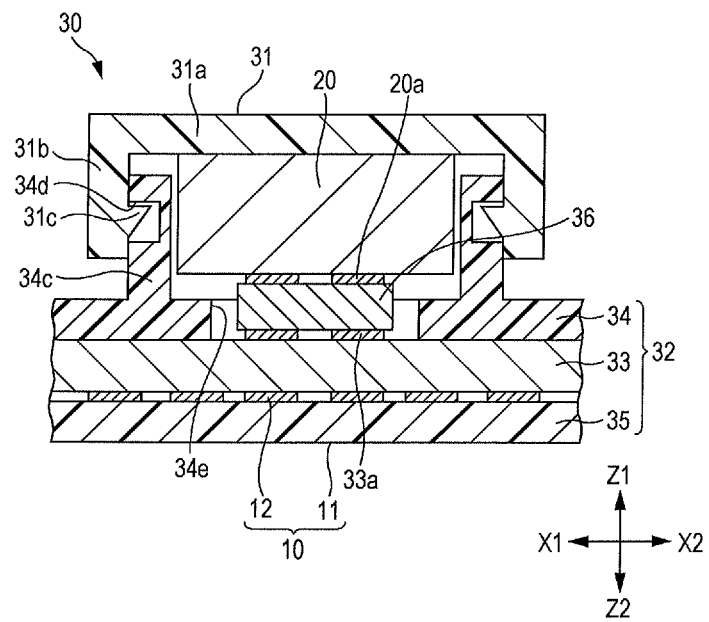
FIGS. 5A and 5B are schematic cross-sectional views of the holding part according to the first embodiment of the present invention.
Figure 5B:
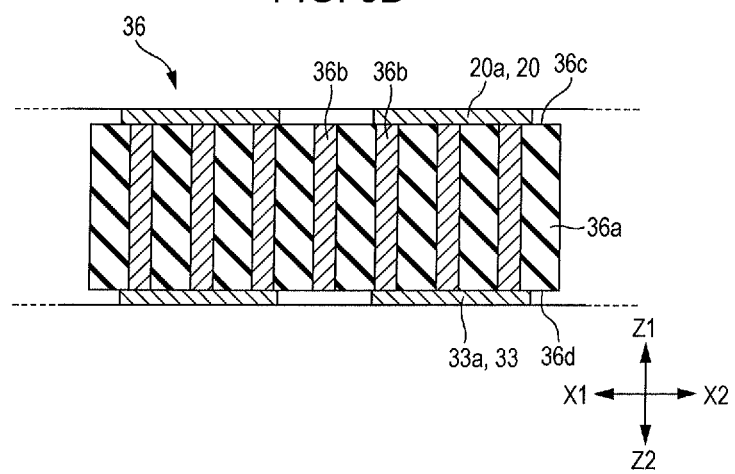
Figure 6:
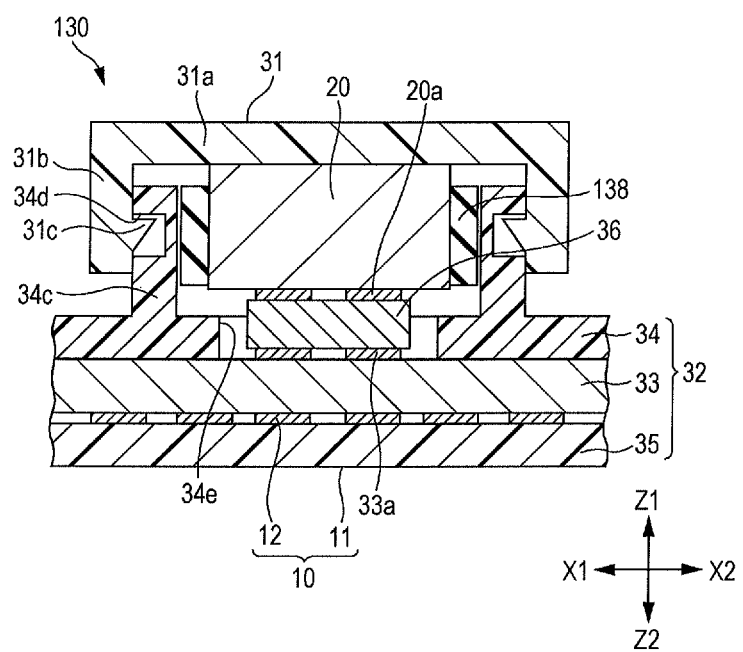
FIG. 6 is a schematic cross-sectional view of a holding part according to a second embodiment of the present invention.
Figure 7:
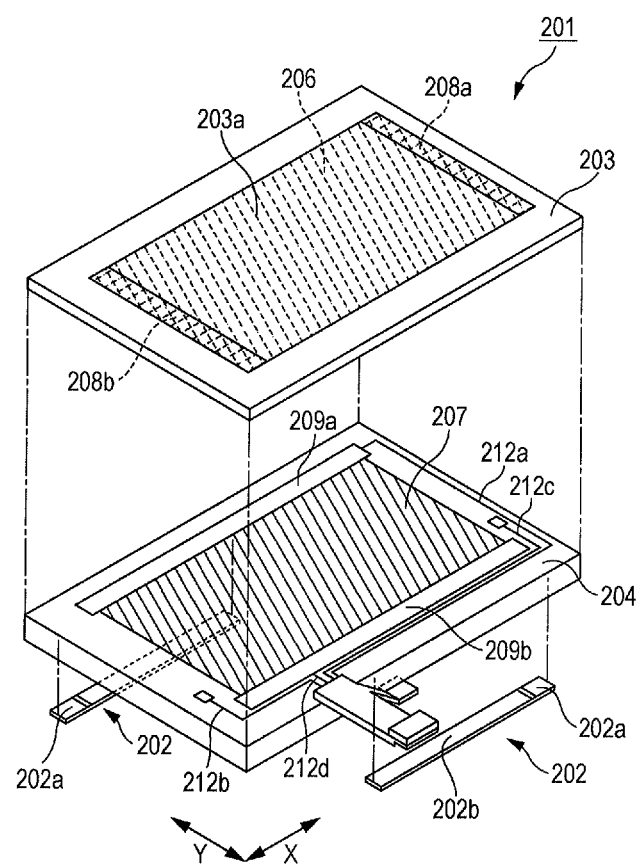
FIG. 7 illustrates the structure of a conventional input device.

FIG. 1 illustrates the structure of an input device 1 according to a first embodiment of the present invention. FIG. 2 is a perspective view of a holding part 30 according to the first embodiment of the present invention. FIG. 3A is a top view of the holding part 30 according to the first embodiment of the present invention, and FIG. 3B is its side view. FIG. 4 is an exploded perspective view of the holding part 30 according to the first embodiment of the present invention. FIG. 5A is a schematic cross-sectional view illustrating the structure of the holding part 30 according to the first embodiment of the present invention, the cross-sectional view being taken along line VA-VA in FIG. 3A, and FIG. 5B is a schematic enlarged cross-sectional view of an elastic member 36 illustrated in FIG. 5A. FIG. 6 is a schematic cross-sectional view illustrating the structure of a holding part 130 according to a second embodiment of the present invention, the cross-section being at a position corresponding to the position of the cross-section in FIG. 5A.

First Embodiment

First, the structure of the input device 1 according to the first embodiment of the present invention will be described with reference to FIG. 1 to FIGS. 5A and 5B. The input device 1 according to the first embodiment of the present invention is used as a controller of a game machine. The input device 1 has an input part 10 (input means), a vibration generator 20, a holding part 30 (vibration generator holding structure), an electronic circuit 40, and a case 50, as illustrated in FIG. 1.

The input part 10 is an input means for detecting an input manipulation performed by a manipulator. The input part 10 includes a manipulation surface 11 and an input detector 12 as illustrated in FIGS. 2 to 4. In this embodiment, the input part 10 is an input means adaptable to an input detection method; the input part 10 is called a capacitive type of input means. The manipulation surface 11 accepts an input manipulation by which a manipulation body such as a fingertip of the manipulator (simply referred to below as the manipulation body) is brought close to or in contact with the manipulation surface 11. The input detector 12 is preferably a detection electrode for detecting a capacitance. The capacitance detected by using the input detector 12 changes when the manipulation body is brought close to or in contact with the manipulation surface 11. In this embodiment, the input manipulation described above can be detected according to a change in the detected capacitance.

The vibration generator 20 generates vibration to be transmitted to the manipulator. In this embodiment, the vibration generator 20 is an electromagnetic induction type of vibration generator. As illustrated in FIGS. 4 and 5A, the outside shape of the vibration generator 20 is a substantially rectangular parallelepiped; it has an upper surface forming a top, a lower surface forming a bottom, and side surfaces forming the peripheral part. The vibration generator 20 incorporates a permanent magnet (not illustrated) and an electromagnet (not illustrated) placed close to the permanent magnet. Terminal electrodes 20a, which are electrically connected to the electromagnet, are provided at the bottom of the vibration generator 20. When a predetermined alternating-current voltage is applied to the terminal electrodes 20a, the vibration generator 20 generates a magnetic force between the permanent magnet and the electromagnet and generates vibration in the up-and-down direction due to changes in the generated magnetic force.

The holding part 30 holds the vibration generator 20. As illustrated in FIGS. 2 to 4, the holding part 30 includes a first holding member 31, a second holding member 32, and an elastic member 36, and also preferably includes an attachment member 37. The second holding member 32 is placed below the first holding member 31 with the vibration generator 20 interposed between them (the second holding member 32 is placed opposite to the first holding member 31 with respect to the vibration generator 20). The second holding member 32 faces the vibration generator 20 with a clearance left between them. The elastic member 36 is interposed between the vibration generator 20 and the second holding member 32. The attachment member 37 is formed integrally with the second holding member 32.

The first holding member 31 is a cover member made of a synthetic resin. The first holding member 31 has a top plate 31a, formed in a substantially rectangular shape, which is in contact with the upper surface of the vibration generator 20, and also preferably has extending parts 31b, which extend downwardly (toward the second holding member 32) from predetermined positions on the periphery of the top plate 31a, as illustrated in FIGS. 4 and 5A. Engaging parts 31c, each of which is a convex part for use in engagement with the second holding member 32, are preferably provided at predetermined positions on the extending parts 31b.

The second holding member 32 is formed by combining a wiring board 33, an upper case 34, and a lower case 35 as illustrated in FIGS. 4 and 5A. The wiring board 33, which is shaped like a circular plate, has a substantially circular upper surface (a plate surface on one side) and a lower surface (a plate surface on the other side), as illustrated in FIGS. 4 and 5A. Terminal electrodes 33a, which are electrically connected to the terminal electrodes 20a of the vibration generator 20, are provided at positions, on the front side on the upper surface of the wiring board 33, at which the terminal electrodes 33a face the vibration generator 20. The detection electrode described above, which is the input detector 12, is provided on the lower surface of the wiring board 33. At a predetermined position on the rear side on the upper surface of the wiring board 33, a connector 33b is provided that is used to electrically connect the terminal electrodes 33a and input detector 12 to the electronic circuit 40.

The upper case 34 is an engaging member made of a synthetic resin (resin member for use in engagement). As illustrated in FIG. 4, the upper case 34 has a top plate 34a formed in a substantially circular shape and a side wall 34b, which extends downwardly from the top plate 34a so as to enclose the periphery of the wiring board 33. The top plate 34a has an upper surface and a lower surface; the lower surface of the top plate 34a is fastened to the upper surface of the wiring board 33. A frame 34c is preferably provided at a position on the upper surface of the top plate 34a at which the frame 34c faces the vibration generator 20; the frame 34c preferably extends upwardly (toward the first holding member 31) so as to enclose the vibration generator 20.

Engaged parts 34d, which are concave parts that the engaging parts 31c of the first holding member 31 engage, are preferably provided at predetermined positions on the frame 34c. An opening 34e is formed at a position, in an area defined by the frame 34c on the top plate 34a, at which the opening 34e faces the terminal electrodes 33a, so that terminal electrodes 33a are exposed. An opening 34f is formed at a position, on the top plate 34a, at which the opening 34f faces the connector 33b, so as to enclose the connector 33b.

The lower case 35, which is a member made of a synthetic resin, is used for manipulation. The lower case 35 has a bottom plate 35a formed in a substantially circular shape and also has a side wall 35b extending upwardly from the bottom plate 35a so as to enclose the side wall 34b of the upper case 34, as illustrated in FIG. 4. The bottom plate 35a has an upper surface and a lower surface. The upper surface of the bottom plate 35a is fastened to the lower surface of the wiring board 33. The lower surface of the bottom plate 35a is the manipulation surface 11 that accepts an input manipulation performed by the manipulator.

The elastic member 36 is preferably a member called a rubber connector, the outside shape of which is a substantially rectangular parallelepiped, and which is elastically deformable in the up-and-down direction. As illustrated in FIG. 5B, the elastic member 36 is formed by embedding a plurality of elongated metal wires 36b, which extend in the up-and-down direction, in a rubber member 36a, the outside shape of which is a substantially rectangular parallelepiped, and which is elastically deformable in the up-and-down direction. Each metal wire 36b is flexible; it is deformed according to the elastic deformation of the rubber member 36a.

The upper end of each metal wire 36b is exposed to the upper end of the elastic member 36, and the lower end of the metal wire 36b is exposed to the lower end of the elastic member 36. The upper end of the elastic member 36 forms a first terminal part 36c, and the lower end forms a second terminal part 36d. The first terminal part 36c and second terminal part 36d disposed in this way face each other in the up-and-down direction and are electrically connected to each other through the metal wires 36b.

The lower end of the elastic member 36 is inserted into the opening 34e formed in the upper case 34 and is placed on the wiring board 33. The vibration generator 20 is placed on the elastic member 36. The elastic member 36 is supported by the wiring board 33 from below, and urges the vibration generator 20 upwardly by using the repulsive force of the elastic member 36. The first terminal part 36c of the elastic member 36 is preferably in contact with the terminal electrodes 20a of the vibration generator 20, and the second terminal part 36d of the elastic member 36 is preferably in contact with the terminal electrodes 33a of the wiring board 33. Since the first terminal part 36c of the elastic member 36 is in contact with the terminal electrodes 20a of the vibration generator 20, and the second terminal part 36d of the elastic member 36 is in contact with the terminal electrodes 33a of the wiring board 33 as described above, the vibration generator 20 and wiring board 33 are electrically connected to each other through the elastic member 36.

Since, in this embodiment, the metal wires 36b are deformed according to the elastic deformation of the rubber member 36a, even if the elastic member 36 is elastically deformed in the up-and-down direction, the electrical connection between the vibration generator 20 and the wiring board 33 is maintained as long as the first terminal part 36c is in contact with the terminal electrodes 20a and the second terminal part 36d is in contact with the terminal electrodes 33a. In this embodiment, due to the repulsive force of the elastic member 36, the contact of the first terminal part 36c of the elastic member 36 with the terminal electrodes 20a of the vibration generator 20 and the contact of the second terminal part 36d of the elastic member 36 with the terminal electrodes 33a of the wiring board 33 can be stably maintained. Therefore, even if the vibration generator 20 vibrates, the electrical connection between the vibration generator 20 and the wiring board 33 can be stably maintained.

The attachment member 37 is made of a synthetic resin; it is used for attachment. The attachment member 37 preferably has a fixing part 37a and an arm 37b as illustrated in FIGS. 2 to 4. The fixing part 37a is shaped like a substantially rectangular plate. Through-holes 37c are formed in the fixing part 37a at predetermined positions, which are used to secure the case 50 with screws. The arm 37b is preferably a flexible portion shaped like an elongated plate. The arm 37b preferably links the fixing part 37a and the upper case 34 of the second holding member 32 to each other. In this embodiment, the fixing part 37a and arm 37b of the attachment member 37 and the upper case 34 of the second holding member 32 are integrally formed by using a single material.

The electronic circuit 40 includes a circuit board 41 disposed at a predetermined position in the case 50 and also includes an electronic part 42, such as an integrated circuit (IC) chip, mounted on the circuit board 41, as illustrated in FIG. 1. The electronic circuit 40 is electrically connected to the input detector 12 and the terminal electrodes 33a disposed on the wiring board 33 through the connector 33b, wiring members (not illustrated), and the like. The electronic circuit 40 applies a predetermined alternating-current voltage to the terminal electrodes 33a to control the vibration generator 20. The electronic circuit 40 also determines, from the capacitance detected by the input detector 12, whether an input manipulation has been performed and what is the input manipulation.

The case 50 accommodates the input part 10, vibration generator 20, holding part 30, and electronic circuit 40 as illustrated in FIG. 1. The case 50 has an attached part 51, to which the holding part 30 is attached. The fixing part 37a of the attachment member 37 is secured to the attached part 51 with screws. An opening 52 is formed in the case 50 so that the manipulation surface 11 of the input part 10 is exposed to the outside. The position of the opening 52 and its shape are determined so that when the holding part 30 is attached to the case 50, the manipulation surface 11 is exposed through the opening 52 to the outside. The input device 1 is formed in this way.

Next, the method of assembling the input device 1 will be described. First, the upper case 34 and lower case 35 are attached to the wiring board 33, on which the terminal electrode 33a, input detector 12, and connector 33b are mounted. Then, the lower surface of the top plate 34a of the upper case 34 is fastened to the upper surface of the wiring board 33 with an adhesive or the like, and the upper surface of the bottom plate 35a of the lower case 35 is fastened to the lower surface of the wiring board 33 with an adhesive or the like. This completes the assembling of the second holding member 32.

Next, the lower end of the elastic member 36 is inserted into the opening 34e formed in the upper case 34, after which the elastic member 36 is placed on the terminal electrodes 33a disposed on the upper surface of the wiring board 33. Then, the vibration generator 20 is inserted into a space defined by the frame 34c and is placed on the elastic member 36. The first holding member 31 is attached from above the vibration generator 20, and the engaging parts 31c of the first holding member 31 are engaged with the engaged parts 34d of the upper case 34. The vibration generator 20 is held by the holding part 30 in this way.

As a result, the wiring board 33 of the second holding member 32 is preferably disposed so as to be opposite to the first holding member 31 with respect to the vibration generator 20 and preferably faces the vibration generator 20 with a clearance left between the wiring board 33 and the vibration generator 20. The elastic member 36 is preferably interposed between the vibration generator 20 and the wiring board 33 of the second holding member 32 and preferably urges the vibration generator 20 upwardly (toward the first holding member 31). When the vibration generator 20 is urged upwardly, the upper end of the vibration generator 20 abuts the top plate 31a of the first holding member 31. Due to the repulsive force of the elastic member 36, the first terminal part 36c of the elastic member 36 abuts the terminal electrodes 20a of the vibration generator 20, and the second terminal part 36d of the elastic member 36 abuts the terminal electrodes 33a of the wiring board 33.

Since the wiring board 33 of the second holding member 32 is disposed so as to face the vibration generator 20 with a clearance left between them, the vibration generator 20 and wiring board 33 are located close to each other. Since the input detector 12 is disposed on the lower surface of the wiring board 33 and the manipulation surface 11 is the lower surface of the bottom plate 35a of the lower case 35 fastened to the lower surface of the wiring board 33, the input part 10 and the vibration generator 20 are located close to each other.

Next, the circuit board 41 on which the electronic part 42 is mounted is attached to a predetermined position in the case 50, placing the electronic circuit 40 in the case 50. Then, the fixing part 37a of the attachment member 37 is secured to the attached part 51 of the case 50 with screws, exposing the manipulation surface 11 to the outside through the opening 52. The holding part 30 is held by the case 50 together with the input part 10 and vibration generator 20, as described above. Then, the terminal electrodes 33a and input detector 12 attached to the wiring board 33 are electrically connected to the electronic circuit 40 through the connector 33b, wiring members (not illustrated), and the like. This completes the assembling of the input device 1.

As a result, the vibration generator 20 generates vibration under control of the electronic circuit 40. The vibration generated by the vibration generator 20 is transmitted to the first holding member 31 of the holding part 30 and to the second holding member 32, which is engaged with the first holding member 31, through the first holding member 31. The input device 1 becomes ready for accepting an input manipulation through the manipulation surface 11 exposed from the opening 52. The input device 1 also becomes ready for transmitting the vibration, which has been transmitted from the vibration generator 20 to the second holding member 32, to the manipulator through the manipulation surface 11. Thus, the input device 1 can detect an input manipulation and can feed back vibration in response to the input manipulation within a short interval of time.

Next, effects of this embodiment will be described. For the holding part 30 in this embodiment (vibration generator holding structure) to hold the vibration generator 20, the top plate 31a of the first holding member 31 comes into contact with the upper end of the vibration generator 20 and the elastic member 36 supported by the second holding member 32 urges the vibration generator 20 upwardly (toward the first holding member 31). Thereby, the vibration generator 20 is fastened directly neither to the first holding member 31 nor to the second holding member 32, so the vibration generator 20 can be held without the fastened portion being damaged. In addition, since the elastic member 36 urges the vibration generator 20 upwardly, the contact between the vibration generator 20 and the first holding member 31 can be stably maintained. As a result, the vibration generator 20 can be stably held. Furthermore, the stable contact between the vibration generator 20 and the first holding member 31 enables vibration to be stably transmitted from the vibration generator 20 to the first holding member 31. Since the first holding member 31 is engaged with the second holding member 32, vibration can be stably transmitted from the vibration generator 20 through the first holding member 31 to the second holding member 32. As a result, vibration can be stably transmitted from the vibration generator 20 to the first holding member 31 and second holding member 32.

With the holding part 30 in this embodiment, the wiring board 33 of the second holding member 32 is preferably disposed so as to be opposite to the first holding member 31 with respect to the vibration generator 20 and preferably faces the vibration generator 20 with a clearance left between the wiring board 33 and the vibration generator 20, so the elastic member 36 can be easily interposed between the vibration generator 20 and the wiring board 33 of the second holding member 32. The elastic member 36 is preferably interposed between the vibration generator 20 and the wiring board 33 of the second holding member 32, so the vibration generator 20 can be easily urged toward the first holding member 31. As a result, the vibration generator 20 can be more stably held and vibration can be more stably transmitted.

The holding part 30 preferably further has the attachment member 37 for use in attachment to the case 50 and the attachment member 37 preferably has the fixing part 37a secured to the attached part 51 of the case 50, so the holding part 30 can be easily attached to the case 50. In addition, the attachment member 37 preferably has the arm 37b that links the upper case 34 of the second holding member 32 and the fixing part 37a of the attachment member 37 together, and the arm 37b is preferably flexible, so the second holding member 32 can be elastically supported by the arm 37b. Therefore, vibration can be more efficiently transmitted from the vibration generator 20 to the second holding member 32 than in a case in which the second holding member 32 is supported by a rigid member.

With the holding part 30 in this embodiment, the second holding member 32 preferably includes the wiring board 33 disposed so that its upper surface (a plate surface on one side) faces the vibration generator 20 with a clearance left between them. Therefore, the vibration generator 20 and wiring board 33 can be disposed so as to be close to each other. In addition, since the elastic member 36 is a rubber connector, a member that urges the vibration generator 20 can also be used as a member that electrically connects the vibration generator 20 and wiring board 33 to each other, enabling the structure to be simplified. Furthermore, due to the elastic deformation of the elastic member 36, the contact between the first terminal part 36c of the elastic member 36 and the terminal electrodes 20a of the vibration generator 20 and the contact between the second terminal part 36d of the elastic member 36 and the terminal electrodes 33a of the wiring board 33 can be stably maintained. This assures stable electric connections between the vibration generator 20 and the wiring board 33.

With the holding part 30 in this embodiment, the engaging parts 31c are preferably provided at predetermined positions on the extending parts 31b extending downwardly (toward the second holding member 32) from the top plate 31a of the first holding member 31, and the engaged parts 34d are preferably provided at predetermined positions on the upper case 34 (resin member for use in engagement) fastened to the upper surface of the wiring board 33, so the engaging parts 31c and engaged parts 34d can be brought close to each other. This enables the first holding member 31 and second holding member 32 to be easily engaged with each other. In addition, the upper case 34, which is a resin member, is less rigid than members made of a metal or the like, so the upper case 34 can be easily machined to a complex shape. Therefore, the upper case 34 is suitable to the machining of the engaged parts 34d.

With the holding part 30 in this embodiment, the frame 34c extends upwardly (toward the vibration generator 20) so as to enclose the vibration generator 20, so the frame 34c can restrict the movement of the vibration generator 20 in directions along the surface of the wiring board 33, for example, in the right-and-left direction and front-and-back direction. This enables the vibration generator 20 to be further stably held. In addition, since the engaged parts 34d are disposed at predetermined positions on the frame 34c, a resin member for use in engagement can also be used as a member that restricts the movement of the vibration generator 20, enabling the structure to be further simplified.

Since the input device 1 in this embodiment has the input part 10 for detecting an input manipulation performed by a manipulator and the vibration generator 20 that generates vibration to be transmitted to the manipulator, the input device 1 can detect an input manipulation and can feed back vibration in response to the input manipulation. In addition, since the input device 1 has the holding part 30 formed as described above, the input device 1 can stably hold the vibration generator 20 and can stably transmit vibration.

The input device 1 also has the holding part 30 formed as described above. With the holding part 30, the second holding member 32 preferably includes the wiring board 33 disposed so that its upper surface faces the vibration generator 20 with a clearance left between them. The input part 10 has the input detector 12 disposed on the lower surface of the wiring board 33 (another plate surface opposite to the upper surface of the wiring board 33). Therefore, the vibration generator 20 and the input detector 12 of the input part 10 can be easily brought close to each other with the wiring board 33 intervening between them. As a result, the input device 1 can easily detect an input manipulation and can easily feed back vibration in response to the input manipulation.

With the input device 1 in this embodiment, the input detector 12 is preferably a detection electrode for detecting a capacitance. This type of detection electrode can be easily formed on the lower surface of the wiring board 33. In addition, when this type of detection electrode is used, a manipulation body brought close to or in contact with the wiring board 33 can be easily detected. Therefore, the input detector 12 is suitable for detecting an input manipulation in a case in which vibration is demanded to be fed back in response to an input manipulation.

The detection electrode functioning as the input detector 12 may be formed in an inner layer of the wiring board 33, instead of being formed on the lower surface of the wiring board 33. If a laminated circuit board is used as the wiring board 33, the detection electrode can be easily formed in an inner layer of the wiring board 33. Even if the detection electrode is formed in an inner layer of the wiring board 33, the same effect is obtained as when the detection electrode is formed on the lower surface of the wiring board 33.

Second Embodiment

Next, the structure of a holding part according to a second embodiment of the present invention will be described with reference to FIG. 6. In this embodiment, constituent elements that are the same as in the first embodiment will be given the same reference characters and detailed descriptions will be omitted. The holding part 130 in the second embodiment of the present invention preferably has a structure in which elastic support members 138 are further added to the structure of the holding part 30 in the first embodiment. The elastic support member 138 is an elastically deformable rubber member shaped like a thin plate.

With the holding part 130, the frame 34c of the upper case 34 preferably encloses the periphery of the vibration generator 20 with a clearance left between them, as illustrated in FIG. 6. The vibration generator 20 is accommodated in a space defined by the frame 34c. The elastic support members 138 are preferably interposed between the frame 34c and the periphery of the vibration generator 20. The plate surface of each elastic support member 138 on a side facing the vibration generator 20 is brought into pressure contact with the periphery of the vibration generator 20, preferably supporting the vibration generator 20 elastically.

Next, effects of this embodiment will be described. In this embodiment, only effects different from the first embodiment will be described. With the holding part 130 in this embodiment, the frame 34c of the upper case 34 preferably encloses the periphery of the vibration generator 20 with a clearance left between them, so the elastic support members 138 can be interposed between the frame 34c and the periphery of the vibration generator 20. Since the elastic support members 138 is preferably interposed between the frame 34c and the vibration generator 20 and preferably support the vibration generator 20 elastically, the vibration generator 20 can be further stably held.

So far, embodiments of the present invention have been described. However, the present invention is not limited to these embodiments. The present invention can be appropriately modified without departing from the intended scope of the present invention.

In the embodiments of the present invention, the structure of the input device 1, for example, may be appropriately changed. The input part 10, for example, may be an input means other than a capacitive type of input means, such as a resistive or infrared type of input means. The vibration generator 20 may be a vibration generator other than an electromagnetic induction type of vibration generator, such as a piezoelectric type of vibration generator. The input device 1 may further have a switching element that accepts a pressing manipulation from the manipulator and other members not described above.

In the embodiments described above, the first holding member 31 and second holding member 32 may have a structure and a shape other than those described above. The number of engaging parts 31c and engaged parts 34d and their shapes may be appropriately changed to match the shapes of the first holding member 31 and second holding member 32. On the wiring board 33, a certain electronic circuit in which an IC chip and other electronic parts are mounted may be formed.

In the embodiments described above, if stable electric connections are assured between the vibration generator 20 and the wiring board 33, the elastic member 36 may not be a rubber connector; as the elastic member 36, another wiring member may be used to interconnect the vibration generator 20 and wiring board 33.

In the embodiments described above, the attachment member 37 may be formed in a place other than the left side of the second holding member 32. The attachment member 37 may not be formed integrally with the upper case 34 of the second holding member 32.

In the embodiments described above, the input device 1 lacks the electronic circuit 40; the input detector 12 and the terminal electrodes 33a on the wiring board 33 may be electrically connected to an electronic circuit in a game machine through a wiring cable or the like. Part of the electronic circuit 40 may be formed on the wiring board 33.

In the embodiments described above, the input device 1 may be an input device other than a controller for a game machine. An electronic device other than an input device may have the holding part 30 or holding part 130 together with the vibration generator 20.

What is claimed is:

1. A vibration generator holding structure comprising:
    a vibration generator;
    a first holding member that is in contact with the vibration generator;
    a second holding member that engages the first holding member;
    an elastic member that is supported by the second holding member and urges the vibration generator toward the first holding member; and
    an attachment member for use in attachment to another member;
    wherein:
    the second holding member is disposed so as to be opposite to the first holding member with respect to the vibration generator and faces the vibration generator with a clearance left between the second holding member and the vibration generator;
    the elastic member is interposed between the vibration generator and the second holding member and urges the vibration generator toward the first holding member; and
    the attachment member has a fixing part secured to the another member and a flexible arm that links the second holding member and the fixing part together.

2. The vibration generator holding structure according to claim 1, wherein:
    the second holding member includes a wiring board disposed so that one plate surface of the wiring board faces the vibration generator with a clearance left between the plate surface and the vibration generator;
    the elastic member comprises a rubber connector that has a first terminal part and a second terminal part, the first terminal part and the second terminal part being disposed so as to face each other along a direction in which the elastic member is deformed and being electrically connected to each other; and
    the rubber connector is interposed between the vibration generator and the wiring board so that the first terminal part is in contact with the vibration generator and the second terminal is in contact with the wiring board.

3. The vibration generator holding structure according to claim 2, wherein:

an extending part that extends toward the second holding member is provided at a predetermined position on the first holding member;
    an engaging part that engages the second holding member is provided at a predetermined position on the extending part;
    a resin member for use in engagement is fastened to one plate surface of the wiring board; and
    an engaged part that the engaging part engages is provided at a predetermined position on the resin member.

4. The vibration generator holding structure according to claim 3, wherein:
    the resin member has a frame that extends toward the first holding member so as to enclose the vibration generator; and
    the engaging part is disposed at a predetermined position on the frame.

5. The vibration generator holding structure according to claim 4, further comprising an elastic support member that elastically supports the vibration generator, wherein:
    the frame encloses the vibration generator with a clearance left between the frame and the vibration generator; and
    the elastic support member is interposed between the frame and the vibration generator and elastically supports the vibration generator.

6. An input device comprising:
    an input mechanism for detecting an input manipulation performed by a manipulator;
    a vibration generator that generates vibration to be transmitted to the manipulator; and
    a vibration generator holding structure comprising:
        a first holding member that is in contact with the vibration generator;
        a second holding member that engages the first holding member; and
        an elastic member that is supported by the second holding member and urges the vibration generator toward the first holding member; and
        an attachment member for use in attachment to another member;
        wherein:
        the second holding member is disposed so as to be opposite to the first holding member with respect to the vibration generator and faces the vibration generator with a clearance left between the second holding member and the vibration generator;
        the elastic member is interposed between the vibration generator and the second holding member and urges the vibration generator toward the first holding member; and
        the attachment member has a fixing part secured to the another member and a flexible arm that links the second holding member and the fixing part together.

7. An input device comprising:
    an input mechanism for detecting an input manipulation performed by a manipulator,
    a vibration generator that generates vibration to be transmitted to the manipulator; and
    a vibration generator holding structure comprising:
        a first holding member that is in contact with the vibration generator;
        a second holding member that engages the first holding member;
        an elastic member that is supported by the second holding member and urges the vibration generator toward the first holding member; and an attachment member for use in attachment to another member;

wherein:

the second holding member is disposed so as to be opposite to the first holding member with respect to the vibration generator and faces the vibration generator with a clearance left between the second holding member and the vibration generator;

the elastic member is interposed between the vibration generator and the second holding member and urges the vibration generator toward the first holding member;

the attachment member has a fixing part secured to the another member and a flexible arm that links the second holding member and the fixing part together;

the second holding member includes a wiring board disposed so that one plate surface of the wiring board faces the vibration generator with a clearance left between the plate surface and the vibration generator;

the elastic member comprises a rubber connector that has a first terminal part and a second terminal part, the first terminal part and the second terminal part being disposed so as to face each other along a direction in which the elastic member is deformed and being electrically connected to each other;

the rubber connector is interposed between the vibration generator and the wiring board so that the first terminal part is in contact with the vibration generator and the second terminal is in contact with the wiring board; and the input mechanism has an input detector disposed in an inner layer of the wiring board or on another plate surface of the wiring board.

8. The input device according to claim 7, wherein the input detector is a detection electrode for detecting a capacitance.

* * * * *